United States Patent [19]
Szabo et al.

[11] 3,864,504
[45] Feb. 4, 1975

[54] PROCESS TO PRODUCE HIGH CONCENTRATION TOMATO PUREE BY TRANSFORMING COLLOIDS

[75] Inventors: Zoltan Szabo; Frigyes Hirschberg, both of Budapest, Hungary

[73] Assignee: Komplex Nagyberendezesek Export Import Vallalata, Budapest, Hungary

[22] Filed: Dec. 10, 1973

[21] Appl. No.: 423,589

Related U.S. Application Data

[63] Continuation of Ser. No. 266,389, June 26, 1972, abandoned.

[30] Foreign Application Priority Data
June 26, 1971 Hungary.............................. KO 243

[52] U.S. Cl.................. 426/373, 426/489, 426/518, 426/205
[51] Int. Cl............................................... A23l 1/02
[58] Field of Search ........... 426/271, 365, 370, 372, 426/373, 377, 379, 478, 489, 495, 518, 190, 205, 207, 229, 203

[56] References Cited
UNITED STATES PATENTS
1,991,242  2/1935  Cole...................................... 99/100
2,191,835  2/1940  Snelling ................................ 99/100
3,172,770  3/1965  Miller .................................. 99/205
3,404,012  10/1968  Craig .................................... 99/204

FOREIGN PATENTS OR APPLICATIONS
4,518,258  6/1970  Japan

OTHER PUBLICATIONS

The Chemistry and Technology of Food and Intermime Food Products 2nd Ed., Jourl. 1951, Vol. II, p. 1239, N.Y.

*Primary Examiner*—Norman Yudkoff
*Assistant Examiner*—Hiram H. Bernstein
*Attorney, Agent, or Firm*—Young and Thompson

[57] ABSTRACT

Tomatoes are triturated and the colloids coagulated with calcium chloride. The serum and coagulum are separated and separately concentrated by evaporation, and then are recombined and the coagulum broken with phosphate or citrate. The reconstituted tomato puree is storable for long periods at room temperature and is usable in the manner of prior art tomato purees.

2 Claims, 1 Drawing Figure

Process diagram of a preferred method
for making high concentration tomato
puree

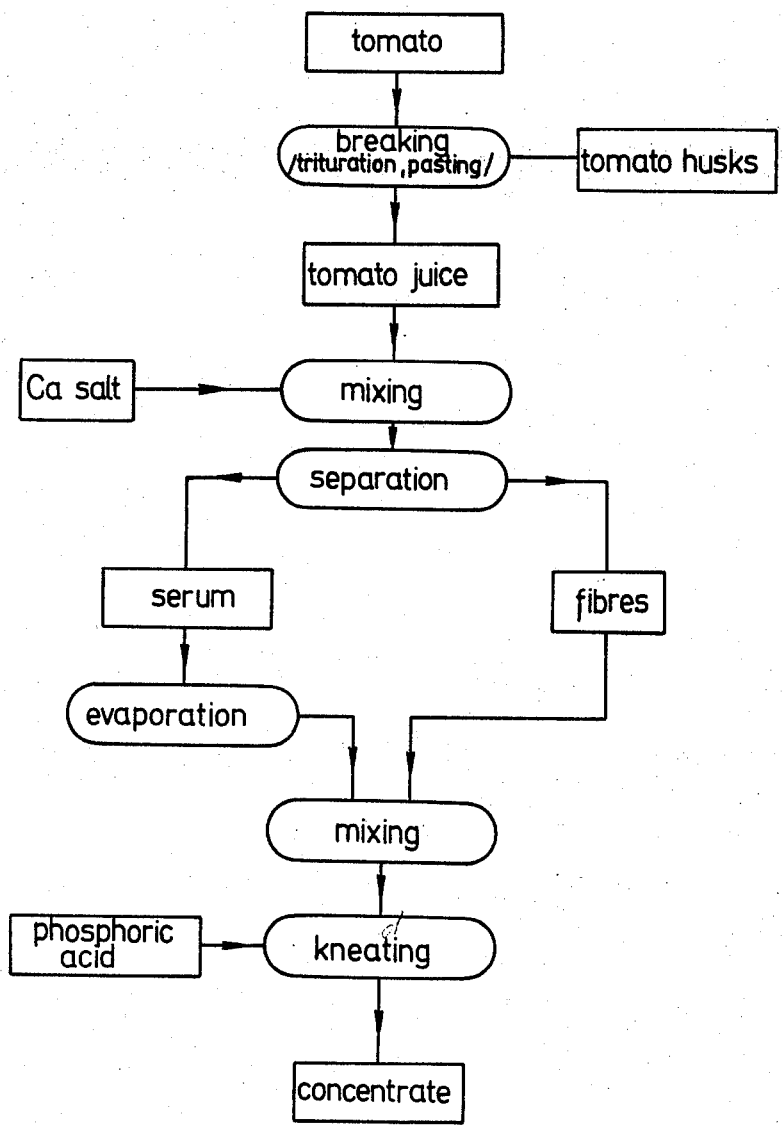
Process diagram of a preferred method for making high concentration tomato puree

PROCESS TO PRODUCE HIGH CONCENTRATION TOMATO PUREE BY TRANSFORMING COLLOIDS

This is a continuation of application Ser. No. 266,389, filed June 26, 1972 and now abandoned.

DESCRIPTION OF THE PROCESS

In course of producing tomato puree tomato is triturated partly in order to remove skin and seed parts, and partly to get a liquid consistence, easier to handle during the following operations. The triturated tomato is a combined material containing solved molecules, colloidal disperse and difform materials as well as rough fibres. The colloidal particles and some sorts of fibres undergo certain transformations due to the effect of the heat, in course of which their viscosity is changed, the spiral fibres get desorganized, etc. This explains the considerable difference between the characteristics of the triturated tomato juices obtained by cold or warm trituration. It is also due to the heat treatment, that is the change of colloids and fibres due to the heat treatment, that the triturated tomato gets after a relatively low rate/6-8 fold/concentration a heavily flowing, thick paste-like consistence.

The triturated, especially the coldly triturated tomato shows after a longer standing at the bottom of the dish a yellowish coloured liquid separation, this serum is separated from the gelatinous part, situated on the upper part, probably due to the effect of sineresis. The colloids and fibres situated on the upper part have still intensively hydrophile characteristics, consequently pressing or certrifuging them requires remarkable energy.

The serum was separated till now based on the patents and industrial processes with meachanical effects, so first of all by centrifuges and separators. This separating system is requiring rather great energy.

Evaporation of the serum offers more advantages. The most important of these is that in this case the swelling of colloids is eliminated, and the serum, like a nearly Newtonian liquid, keeps its liquid characteristics after a relatively great evaporation too, so application of the mixing equipment requiring great energy and the spheric vacuum evaporators, having unfavourable efficiency, becomes unnecessary.

Our patent is based on the recognition that the colloids of the tomato, similarly to the majority of native biological colloids, have negativ electric characteristics, consequently they can be coagulated with polivalent positive ions, that is they can be freed from their hydrophile characteristics. In course of this two basical things must be taken into consideration: from the point of view of coagulation of the colloids the Hoffmeister-series and from the point of view of the food industry that the poisoning ions should not be carried into the food product. Considering the mentioned points, out of the polyvalent cations first of all calcium comes into account. The coagulation effect of calcium is well known from coagulation of milk and blood.

The calcium ions are attached to the surface of the tomato colloids of negative character, displacing from there the monovalent ions, f.e. $H^+$ and $K^+$ ions and establish connection with their valencies between the colloid particles, and consequently coagulate them. Following the adsorption of calcium the colloids loose outwards their electric charge and also their hydrophile characteristics. Applying calciumchloride also the acidifying effect of the hydrogen ions, displaced by calcium ions can also be observed, by changing the pH-value of the tomato juice.

In case of tomato juice the coagulating effect of the calcium ions presents itself with extremely low concentration too. Depending on species, degree of ripeness and year of growth of the tomato naturally the calcium-ion requirement of coagulation is changing, also different quantity od $Ca^{++}$ ion is to be added if tomato juice is triturated cold or warm. In case of cold triturated tomate juice already a few percent 0 of $Ca^{++}$ ion gives a sufficient colloid transformation.

As a result of coagulation the sineresis is expressively speeded up and at the bottom of the dish considerable quantity of serum is separated. A considerable part of the serum can be decanted and evaporated. The red coloured fraction of colloids is very little hygroscopic. With relatively little energy a 20-30 percent watercontents can be obtained mechanically /filterpress, centrifuge, nutsch, screwpress, etc./. The transformed and mechanically dehydrated colloid fraction makes 2-5 percent of the quantity of the triturated tomato juice. The serum fraction obtained by mechanical dehydration of the colloids can be unified with the previous fraction of serum and can be brought together to the evaporators. While standing the serum might become cloudy, it might show colloid separation. This practically does not disturb the evaporation, as these colloids are of practically small quantity and also their characteristics deviate from the separated and filtered-out colloids.

The evaporation of the serum-fraction—as the disturbing effects of colloids are eliminated—is simple, it can be carried out in any kind of vacuum evaporator economically and can be concentrated to such extend that the end-product /after unification with the colloids/ can exceed the dry substance content of 60 percent. The concentrated serum characteristically smells after tomato, is a syrup-like material, which can be stored at room temperature for a long time without being corrupted, in case of proper concentration. The serum concentrate is thickly-flowing in cold state, when heated up, its viscosity decreases.

The serum-fraction concentrate is to be unificated afterwards with the filtered-out colloids. This operation can also be made in a simple mixing equipment. Above the mechanical mixing also application of chemicals is important in order to change back the colloids into their original state. The anion of the chemical to be applied must show a higher affinity to the $Ca^{++}$ ions than the colloid, its cation must have a valence of one, and finally, the chemical itself, and the transformation products occuring in course of the reactions shall not be poisenous. These requirements can be met by application of different phosphates, citrates, further other organic and unorganic compounds.

Quantity of the chemicals is determined by more factors, most important of these is the quantity of the applied Ca, the biological characteristics of the tomato, and the important point of view, to what kind of "corpulence" we want to bring our end-product. Thq quantity of chemicals required to changing back is at the scale of some per thousand of the triturated tomato juice.

The unificated and changed back tomato puree as we mentioned already, might reach or even exceed the dry substant contents of 60 percent, so it can be kept at room temperature for a longer time, as it has such osmotic conditions, which exclude the microbial corruption. This circumstance allows the application of new, more economic packing materials instead of the traditional metal or glass.

The tomato concentrate, produced according to our method has generally a red colour, more lively than the traditional one, has an attractive appearance, smells like tomato. With proper coocking methods dishes can be prepared which have taste and character similar to those made with the traditional tomato purees.

The FIGURE represents a process diagram of a preferred method for making high concentration tomato puree.

Our method is characterized by the following processes:

1. TRITURATION

The washed and sorted out tomato is passed through the traditional tomato triturating machines. It is more advantageous to carry out a cold trituration. In order to obtain more juice, the remainder of the cold trituration can be again warmly triturated, the juice obtained this way can be unificated with the juice fraction of the cold trituration, this does not influence the precipation.

2. PRECIPITATION

To the juice fraction of the tomato some per thousand of precipitant is added in solution /f.e. 1% $CaCl_2$ in a 10 % solution/, the material is then intensely mixed and allowed to stand.

3. Separation of colloids.

From the precipitated material, due to the sineresis effect /depending on the circumstances more or less/ serum is separated, which can be discharged through a tap or can be siphoned off. Serum is obtained from the red coloured precipitate by a suitable equipment /filter, nutsch, centrifuge, separator/ and this is unificated with the earlier obtained serum-fraction.

4. Evaporation of the serum-fraction.

The serum fraction is evaporated under vacuum to the desired concentration. Tubular or film-evaporators are equally suitable for this purpose. /The vapourized dehydration of the serum can also be carried out, similarly the dehydration of the colloid fraction, the product in this case is tomato powder./

5. Changing back.

The properly concentrated serum-fraction is homogenized with proportionate quantity of colloid-fraction and with the chemical added in proper quantity /f.e. 1/2 %0 of phosphorous acid or 1%0 of $Na_3PO_4$ etc./.

6. Packaging.

The high concentration tomato puree produced according to the method described above can be packed in different materials, which are cheaper than the traditional packing materials, also foils can be taken into consideration.

What we claim is:

1. A process of producing tomato puree of high concentration, comprising triturating tomatoes to produce tomato juice and tomato husks, separating the tomato juice from the tomato husks, precipitating a coagulum in the tomato juice by adding a small but effective amount of calcium chloride to the tomato juice leaving a serum, said amount being effective to precipitate said coagulum, separating the coagulum and the serum, evaporating the serum, remixing the coagulum and the serum and adding to the remixed serum and coagulum a small but effective amount of a compound selected from the group consisting of phosphate and citrate whose cations have a valence of one, the latter said amount being effective to break the coagulum thereby to produce a high concentration tomato puree.

2. A process as claimed in claim 1, in which the puree has a dry solids content in excess of 50 percent by weight.

* * * * *